(12) United States Patent
Gibbs et al.

(10) Patent No.: US 11,065,928 B2
(45) Date of Patent: *Jul. 20, 2021

(54) AMPHIBIAN

(71) Applicant: Gibbs Technologies Limited, Nuneaton (GB)

(72) Inventors: Alan Timothy Gibbs, London (GB); Simon James Longdill, Auckland (NZ)

(73) Assignee: Gibbs Technologies Limited, Warwickshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,413

(22) Filed: Jan. 30, 2017

(65) Prior Publication Data

US 2017/0297393 A1 Oct. 19, 2017

Related U.S. Application Data

(63) Continuation of application No. 13/518,718, filed as application No. PCT/GB2010/002317 on Dec. 22, 2010, now Pat. No. 9,555,680.

(60) Provisional application No. 61/289,170, filed on Dec. 22, 2009.

(51) Int. Cl.
*B60F 3/00* (2006.01)

(52) U.S. Cl.
CPC ........ *B60F 3/0084* (2013.01); *B60F 2301/00* (2013.01); *B60F 2301/02* (2013.01)

(58) Field of Classification Search
CPC .. B60F 2301/04; B60F 3/0007; B60F 3/0069; B60F 3/003; B60F 2301/02; B60F 2301/00; B60F 3/00; B60F 3/0084

See application file for complete search history.

(56) References Cited

U.S. PATENT DOCUMENTS

| 3,371,638 A | 3/1968 | Beringer |
| 4,357,893 A | 11/1982 | Frye |
| 4,387,661 A | 6/1983 | Duff |
| 5,632,221 A | 5/1997 | Trenne et al. |

(Continued)

FOREIGN PATENT DOCUMENTS

| DE | 625713 | 4/1937 |
| DE | 19831324 | 1/2000 |

(Continued)

OTHER PUBLICATIONS

European Patent Office; International Search Report; dated Nov. 2, 2011.

*Primary Examiner* — Andrew Polay
(74) *Attorney, Agent, or Firm* — Price Heneveld LLP

(57) ABSTRACT

An amphibious motorcycle with a hull that provides desirable buoyancy for the vehicle to float while in the water and yet allows the vehicle to lean/turn during use on land is provided. The amphibious motorcycle has a front wheel with a front suspension system and a rear wheel with a rear suspension system. Also included can be at least one wheel retraction system that is operable to move the front wheel and/or the rear wheel between a deployed position for use of the amphibious motorcycle on land and a retracted position for use of the amphibious motorcycle on or in the water. The amphibious motorcycle also has a hull that can have a center portion with a center bow and two oppositely disposed and spaced apart side portions each with a side bow.

20 Claims, 3 Drawing Sheets

(56) References Cited

U.S. PATENT DOCUMENTS

| | | | |
|---|---|---|---|
| 5,690,046 A | 11/1997 | Grzech, Jr. | |
| 6,505,694 B2 | 1/2003 | Maguire | |
| 6,540,569 B1 * | 4/2003 | Gong | B60F 3/0007 440/12.5 |
| 7,311,567 B2 | 12/2007 | Gibbs et al. | |
| 2003/0060095 A1 | 3/2003 | Gong | |
| 2004/0157507 A1 | 8/2004 | Pease | |
| 2006/0121802 A1 | 6/2006 | Brown | |
| 2007/0001419 A1 | 1/2007 | Bryham | |
| 2007/0004149 A1 | 1/2007 | Bryham | |
| 2011/0045715 A1 | 2/2011 | Gibbs | |

FOREIGN PATENT DOCUMENTS

| | | |
|---|---|---|
| EP | 1442902 A1 | 8/2004 |
| FR | 1011791 | 6/1952 |
| GB | 2254831 | 10/1992 |
| GB | 2401832 A | 11/2004 |
| GB | 2401833 A | 11/2004 |
| GB | 2452088 A | 2/2009 |
| JP | H02124308 A | 5/1990 |
| JP | H0463709 A | 2/1992 |
| JP | 2004515396 | 5/2004 |
| LU | 84437 | 5/1984 |
| WO | 9924273 | 5/1999 |
| WO | 2005115775 A1 | 12/2005 |
| WO | 2006054073 | 5/2006 |
| WO | 2008023191 | 2/2008 |

* cited by examiner

AMPHIBIAN

CROSS-REFERENCE TO RELATED APPLICATION

This application is a continuation of U.S. patent application Ser. No. 13/518,718, filed Feb. 4, 2013, entitled "AMPHIBIAN," which is a National Stage Application of PCT Application No. PCT/GB2010/002317, filed on Dec. 22, 2010, entitled "AMPHIBIAN," which claims benefit to U.S. Provisional Patent Application No. 61/289,170, filed Dec. 22, 2009, entitled "AMPHIBIAN," the entire disclosures of which are incorporated herein by reference.

BACKGROUND OF THE INVENTION

Amphibious vehicles for recreation, business, and/or military uses are known. Such amphibious vehicles typically have a retractable wheel system that affords for the wheels of the vehicle to be raised to a retracted position during use of the vehicle in the water. In addition, a hull provides buoyancy to the vehicle such that it floats while in the water.

Hulls for three-wheel and four-wheel amphibious vehicles typically provide sufficient buoyancy since the width of the vehicle, and thus the hull, span the width of the front and/or rear axle plus wheels. However, an amphibious motorcycle presents unique challenges with respect to the hull shape, size, etc., since the vehicle is required to lean sideways during riding/turning on land—thereby requiring a hull with a relatively narrow width—and yet the hull must provide sufficient buoyancy to keep the vehicle afloat in the water.

Heretofor amphibious motorcycles have attempted to meet these challenges using additional movable flotation elements that extend from the hull while the vehicle is in the water. These movable flotation elements may take the form of inflatable bellows, movable or foldable flotation aids, or other forms. Such systems have been bulky, required additional moving parts/components, and can be prone to failure. As such, an amphibious motorcycle with a hull that does not require additional bellows, provides sufficient buoyancy for the vehicle to float in the water, and yet allows the vehicle to adequately lean/turn while on land would be desirable.

SUMMARY OF THE INVENTION

The present invention discloses an amphibious motorcycle with a hull that provides sufficient buoyancy for the vehicle to desirably float while in the water and yet allows the vehicle to desirably lean/turn during use on land. The amphibious motorcycle has a front wheel with a front suspension system and a rear wheel with a rear suspension system. Also included can be at least one wheel retraction system that is operable to move the front wheel and/or the rear wheel between a deployed position for use of the amphibious motorcycle on land and a retracted position for use of the amphibious motorcycle on water. The amphibious motorcycle also has a hull having a center portion with a center bow at a forward end thereof and two oppositely disposed and spaced apart side portions each with a side bow at a forward end thereof.

The two side portions can extend parallel to a longitudinal axis of the amphibious motorcycle. The two side portions can also extend forwardly and/or rearwardly beyond the center portion a predefined distance and form a front wheel bay and/or a rear wheel bay, respectively. The front wheel can be located at least partially within the front wheel bay and the two side portions can extend forwardly to, or beyond, a rotation axis of the front wheel when the front wheel is in the deployed position. In some instances, the two side portions can extend forwardly generally equal to a front surface of the front wheel when the front wheel is in the deployed position, or in the alternative, the two side portions can extend forwardly beyond the front surface of the front wheel when the front wheel is in the deployed position.

The rear wheel can be located at least partially within the rear wheel bay and the two side portions can extend rearwardly to, or beyond, a rotation axis of the rear wheel when the rear wheel is in the deployed position. In some instances, the two side portions can extend generally equal to a rear surface of the rear wheel when the rear wheel is in the deployed position, or in the alternative, the two side portions can extend rearwardly beyond the rear surface of the rear wheel when the rear wheel is in the deployed position.

The front wheel bay and the rear wheel bay afford for the front wheel and the rear wheel to move freely between the deployed position and the retracted position. In addition, the wheel bays may or may not be closed or have a closure across a top portion thereof, while the wheel bays do not have a closure along a bottom portion thereof.

These and other features, advantages, and objects of the present invention will be further understood and appreciated by those skilled in the art by reference to the following specification, claims, and appended drawings.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

The present invention discloses an amphibious motorcycle that has desirable leaning/turning capability while in use on the land and desirable buoyancy/stability while in use on water. It is appreciated that for the purposes of the present invention, the term motorcycle includes mopeds, scooters, and other single-track two-wheeled vehicles. In addition, other single-track vehicles that use more than one wheel as a rear wheel and/or front wheel are included within the term motorcycle. For example and for illustrative purposes only, a scooter that has two wheels spaced closely together for use as the rear wheel is included within the use of the term motorcycle.

The amphibious motorcycle can include a front wheel with a front suspension system and a rear wheel with a rear suspension system. At least one wheel retraction system that is operable to move the front wheel and/or the rear wheel between a deployed position for use of the vehicle on land and a retracted position for use of the vehicle on water can also be included. The amphibious motorcycle has a hull with a center portion and two oppositely disposed and spaced apart side portions. Each hull portion has a forward end defining a bow or bow portion and the hull portions are preferably fixed relative to one another and form a generally rigid assembly with a generally continuous outer hull surface.

The two side portions extend forwardly beyond the center portion a predefined distance and form a front wheel bay. The front wheel can be located at least partially within the front wheel bay and the two side portions can extend forwardly beyond a rotation axis of the front wheel when in the deployed position. In some instances, the two side portions can extend generally equal to a front surface of the front wheel, or in the alternative, the two side portions can extend beyond the front surface of the front wheel when the front wheel is in the deployed position.

The two side portions can also extend rearwardly beyond the center portion a predefined distance and form a rear wheel bay. The rear wheel can be located at least partially within the rear wheel bay and the two side portions can extend rearwardly beyond a rotation axis of the rear wheel when in the deployed position. In some instances, the two side portions can extend rearwardly generally equal to a rear surface of the rear wheel, or in the alternative, the two side portions can extend rearwardly beyond the rear surface of the rear wheel when the rear wheel is in the deployed position.

With the two side portions extending forwardly and/or rearwardly beyond the center portion, a hull with desirable flotation and minimum and/or desirable width is provided. Stated differently, extension of the side portions to form the front wheel bay and/or the rear wheel bay provides desirable and/or adequate buoyancy for the vehicle in the water and yet affords for the vehicle to desirably lean/turn during use on the land.

Figure 1:
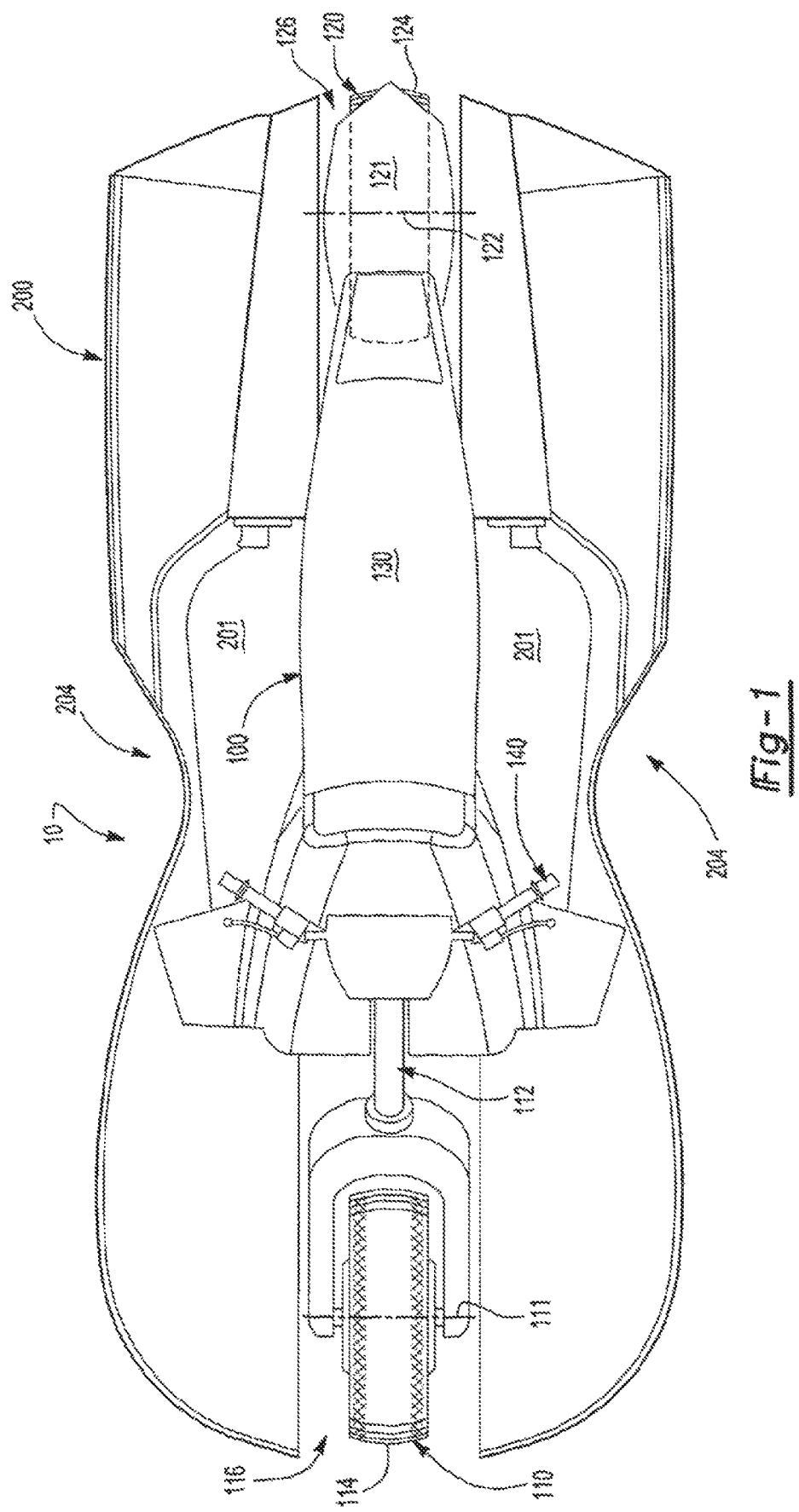
FIG. 1 is a schematic top view of an amphibious motorcycle according to an embodiment of the present invention.

Turning now to FIG. 1, a top view of an embodiment of an amphibious motorcycle is shown generally at reference numeral 10. The amphibious motorcycle 10 can include a motorcycle 100 and a hull 200. The motorcycle 100 can have a front wheel 110, a rear wheel 120, a seat 130, handlebars 140, an engine (not shown), a transmission (not shown) and other components known to those skilled in the art that are used, attached, etc. with or to a motorcycle. For example, the rear wheel 120 can have a rear fender 121, a drive chain, and the like. In addition, the front wheel 110 can have a front fender (not shown), however this is not required. Alternatively or additionally, fenders or mud guards may be fixed to the hull or other part that does not move with the wheels, at the front and/or the back.

Figure 2:
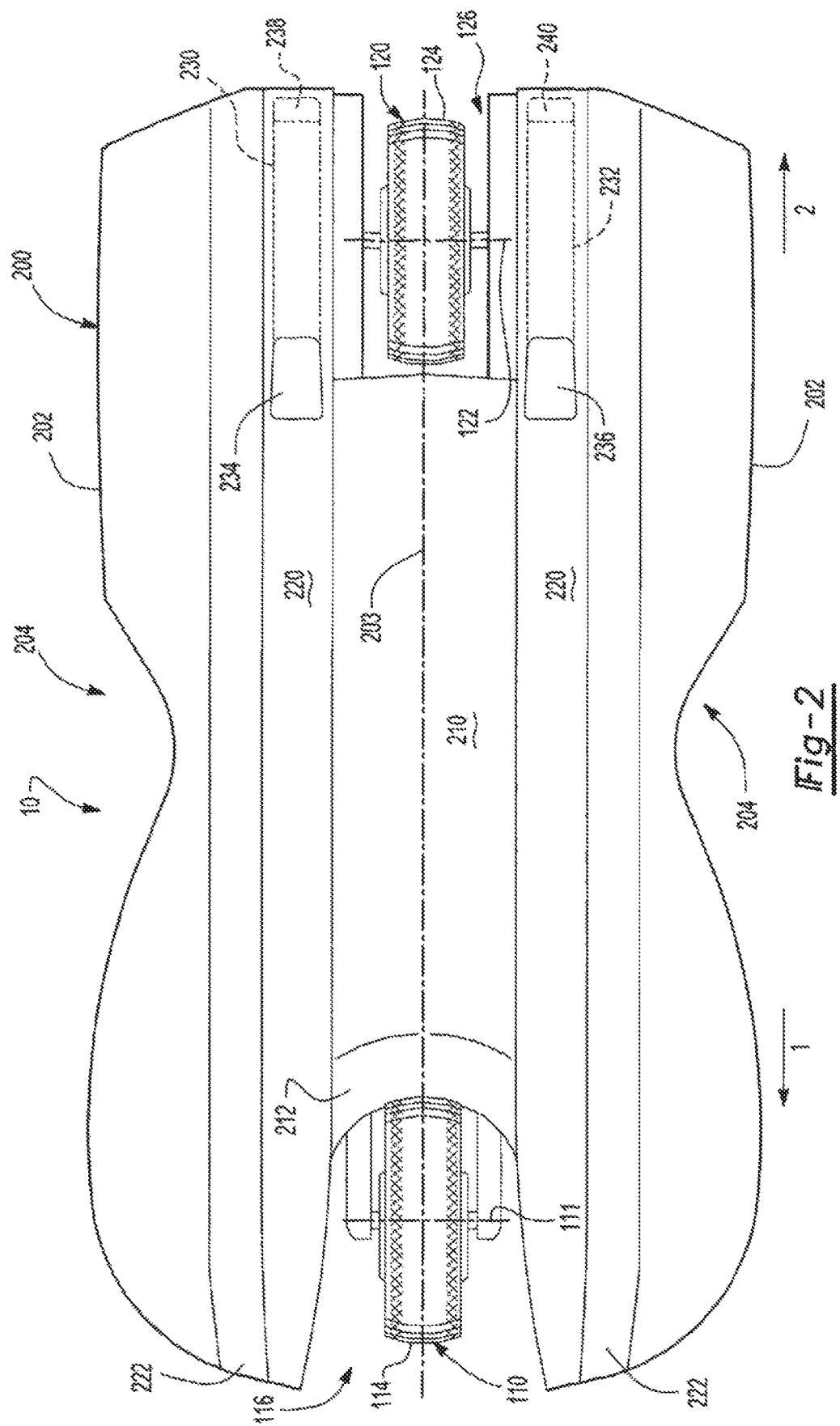
FIG. 2 is a schematic bottom view of the embodiment shown in FIG. 1.

Adding FIG. 2, the hull 200 can have a center portion 210 and two oppositely disposed and spaced apart side portions 220. The overall hull is defined by the combination of the center portion 210 and the side portions 220, which are preferably rigid with respect to one another and together form a continuous outer hull surface. The hull 200 may be said to have a bow at the forward end and a transom at the rearward end. The center portion 210 has a forward end defining a center bow 212 or center portion of the bow. Each of the side portions 220 has a forward end defining a side bow or a side portion of the bow. As used herein, a bow is the fowardmost end of the hull or portion of the hull. In some instances, the side portions 220 can extend in a forwardly direction 1 beyond the center portion 210 and create a front wheel bay 116. In addition the two side portions 220 can extend in a rearwardly direction 2 beyond the center portion 210 and create a rear wheel bay 126. The front wheel 110 can be located at least partially within the front wheel bay 116 and the rear wheel 120 can be located at least partially within the rear wheel bay 126.

In some instances, the two side portions 220 can extend in the forwardly direction I beyond a rotation axis 111 of the front wheel 110. In other instances, the two side portions 220 can extend generally equal to a front surface 114 of the front wheel 110. In still other instances, the two side portions 220 can extend beyond the front surface 114 of the front wheel 110.

In a similar fashion, the two side portions 220 extending in the rearwardly direction 2 can extend beyond a rotation axis 122 of the rear wheel 120. In some instances, the two side portions 220 can extend generally equal to a rear surface 124 of the rear tire 120, or in the alternative extend beyond the rear surface 124.

The hull 200 can also have a waisted portion 204 that affords for a rider of the vehicle IO to place one or more feet on a ground surface in order to stabilize or hold the vehicle IO in an upright position while in use on land. In addition, the hull 200 can have one or more platforms 20 I that afford for a rider to place their feet while riding the vehicle 10 on land or water.

When on land, the motorcycle may be propelled by the rear wheel. When on water, a twin jet propulsion system may be used. A pair of jets 230 and 232 are shown in FIG. 2. Each jet has an inlet 234 and 236 and an outlet 238 and 240. The jet 230 is disposed at least partially in one of the side portions on one side of the rear wheel bay 126 and the other jet 232 is disposed at least partially in the other side portion on the opposite side of the rear wheel bay. Alternatively, a single jet propulsion system (not shown) may be used. The single jet may have one or more inlets and one or more outlets, and be beneficially packaged as necessary. For example, the single jet may disposed centrally or at least partially in one of the side portions. The inlet(s) and outlet(s) may be positioned as necessary, e.g. with ducts to provide ducted flow around or on one or both sides the rear wheel.

Figure 3:
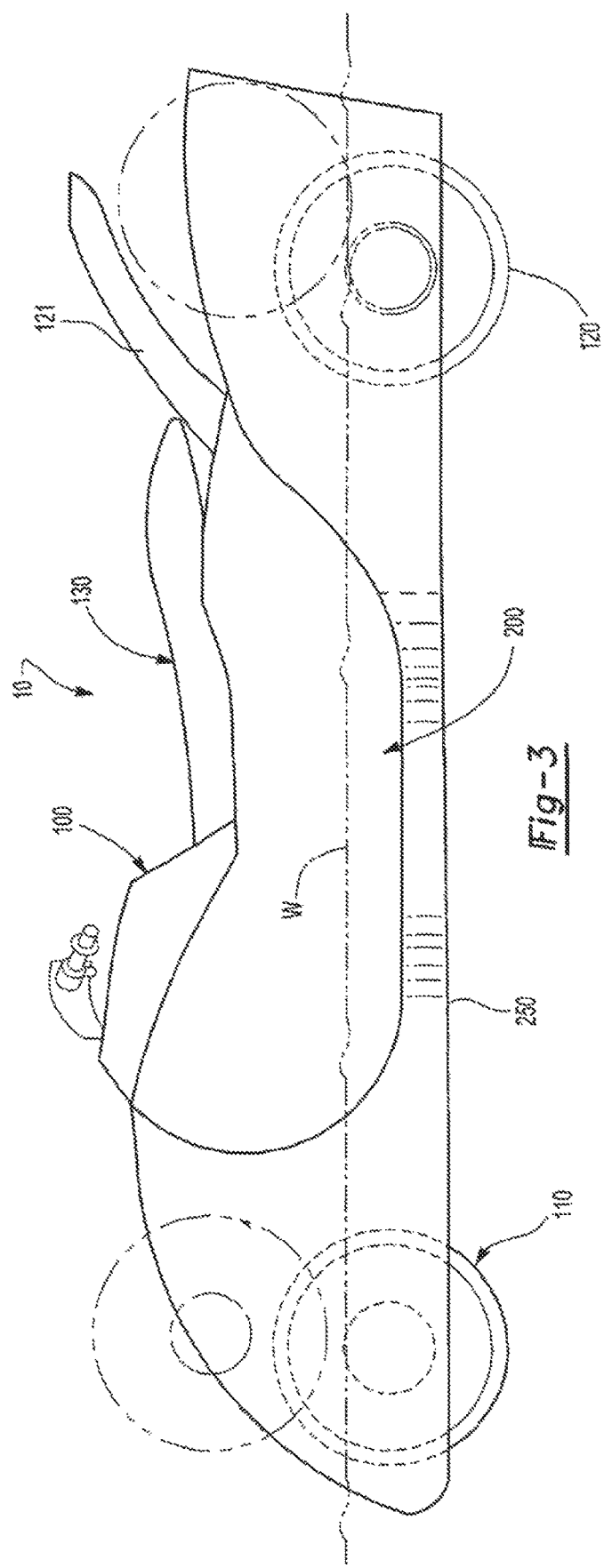
FIG. 3 is a schematic side view of the embodiment shown in FIG. 1 illustrating the front wheel and the rear wheel in a deployed position and retracted position.

Turning now to FIG. 3, a side view of the embodiment shown in FIG. 1 is shown with the front wheel 110 and the rear wheel 120 in a deployed position. It is appreciated that with the front wheel 110 and the rear wheel 120 in the deployed position, one can operate the amphibious motorcycle 10 on land as one would generally operate a motorcycle.

FIG. 3 also illustrates in phantom the front wheel 110 and the rear wheel 120 in a retracted position such that the vehicle can be operated in the water. A water line is shown at w, representing where the water line may be with the motorcycle in the water and not moving. It is appreciated that with the two side portions extending in the forwardly direction I and/or in the rearwardly direction 2, the hull 200 provides a desirable buoyancy for the vehicle 10 while maintaining a desirable and/or minimum width such that leaning/turning can be achieved while in use on land. It is further appreciated that at least one wheel retraction system can be included (not shown) in order to move the front wheel and/or the rear wheel between the deployed position for use of the vehicle 10 on land and the retracted position for use of the vehicle on water.

The front wheel bay 116 and/or the rear wheel bay 126 can have a cover, closure and the like across a top portion thereof, however this is not required. Such a top cover or closure may be fixed in place so as to form part of the upper, dry surface of the body or hull, may be flexible, or may be operable. In contrast, the front wheel bay and the rear wheel bay do not have a closure along a bottom portion thereof. This means that there is no closure or cover in the outer/lower surface of the hull. In this manner, the chance or threat of a cover, closure and the like of being lost, broken, distorted, etc. during use is prevented. In addition, any malfunction of such a cover, closure, etc. due to contamination by mud, dirt, grass, etc. is also prevented. The term "closure" means anything which closes a fixed aperture—including a panel, cover, canopy, or lid. Such a closure may comprise one or more components; and may be closed by manual or powered means. It may rotate, slide, or close in some other way. Generally, a closure moves to close off apertures of a hull, which are underwater when the amphibian is stationary and on the water. Such closures allow planing when in a closed position. The term wheel closure includes a cover that at least partially closes a cavity in the hull in which the wheel is situated when retracted. The term also includes a cover that together with the hull at least partially encapsulates the wheel when retracted. The term also includes a cover which is movable between a position which does not cover a wheel and a position which does cover a wheel, from any angle, so as to form a substantially smooth and unbroken lower hull surface. Therefore, a closure is distinguished from a mud guard, which is permanently deployed whether the wheel is deployed or retracted, and does not move from one position to another during normal operation of the amphibian. Generally, a closure will be located below the wheel when closed. A mud guard will often be fixed to the body work and located above the wheel. When a mud guard is mounted on the forks supporting the wheel, it will be held in a fixed relationship to the wheel. Its orientation may vary as the wheel is deployed or retracted, however unlike a closure, it will not cover a gap in the hull. The outside or wet side of the hull is a side, of the hull exposed to water; as opposed to the inside of the hull, which is dry, being effectively sealed against water ingress. It is acknowledged that a conventional engine compartment requires ingress and egress of air for cooling, combustion and exhaust purposes; but even such air intakes and exhaust openings have labyrinthine passages, commonly known as dorades, in order to exclude as much water as possible.

Although the item 200 has been described as a hull, it is common for amphibians to have a hull, which is a lower, water facing enclosure; and a body, which is an upward enclosure. These may be joined together at a peripheral joint, as disclosed in applicant's application published as US 2006/0199449, which is incorporated herein in its entirety by reference. In the alternative, a singular hull can be used which may or may not have a lower body with a separate but permanently attached upper body. Such a hull can provide attractive styling for the amphibious motorcycle; provide sealing of the steering system against water ingress; provide sealing of the at least one wheel retraction system against water ingress; and provide mountings for desirable equipment such as an instrument console, a windscreen and the like.

The present invention may further comprise a frame, hull or body form or other structure for supporting one or components or sub-assemblies of the amphibious motorcycle. The front wheel and front suspension system can be mounted to said frame, hull or body form or other structure, and the rear wheel and rear suspension system can also be mounted to said frame, hull or body form or other structure.

The invention is not restricted to the illustrative embodiments described above. The examples and embodiments are not intended as limitations of the scope of the invention. Methods, apparatus, compositions and the like described herein are exemplary and not intended as limitations on the scope of the invention. As such, changes therein and other uses will occur to those skilled in the art and the application should be interpreted broadly.

The invention claimed is:

1. An amphibious two-wheeled motorcycle comprising:
   a retractable front wheel of the two-wheeled motorcycle with a front suspension system;
   a retractable rear wheel of the two-wheeled motorcycle with a rear suspension system, wherein the retractable front wheel and the retractable rear wheel are in a same track;
   a hull having a center portion with a center bow at a forward end thereof and two oppositely disposed and spaced apart side portions each with a side bow at a forward end thereof; and
   a front wheel bay defined by a gap between the two oppositely disposed and spaced apart side portions both when the retractable front wheel is in the deployed position and in the retracted position.

2. The amphibious motorcycle of claim 1, wherein said two side portions extend forwardly beyond said center bow a predefined distance so as to form a front wheel bay.

3. The amphibious motorcycle of claim 2, wherein said front wheel is located at least partially within said front wheel bay.

4. The amphibious motorcycle of claim 1, wherein said two side portions extend forwardly beyond a rotation axis of said front wheel when the front wheel is in said deployed position.

5. The amphibious motorcycle of claim 1, wherein said two side portions extend forwardly to a position at least generally equal to a front surface of said front wheel when the front wheel is said deployed position.

6. The amphibious motorcycle of claim 1, wherein said two side portions extend forwardly beyond said front surface of said front wheel when the front wheel is in said deployed position.

7. The amphibious motorcycle of claim 1, wherein said two side portions extend rearwardly beyond said center portion a predefined distance forming a rear wheel bay.

8. The amphibious motorcycle of claim 7, wherein said rear wheel is located at least partially within said rear wheel bay.

9. The amphibious motorcycle of claim 1, wherein said two side portions extend rearwardly beyond a rotation axis of said rear wheel.

10. The amphibious motorcycle of claim 1, wherein said two side portions extend rearwardly at least generally equal to a rear surface of said rear wheel when the rear wheel is in said deployed position.

11. The amphibious motorcycle of claim 1, wherein said two side portions extend rearwardly beyond said rear surface of said rear wheel when the rear wheel is in said deployed position.

12. The amphibious motorcycle of claim 2, wherein the front wheel bay is covered on an upper side thereof.

13. The amphibious motorcycle of claim 7, wherein the rear wheel bay is covered on an upper side thereof.

14. The amphibious motorcycle of claim 1, further comprising:
    a jet propulsion system for propelling the motorcycle on water, the jet propulsion system having a jet with an inlet and an outlet.

15. The amphibious motorcycle of claim 1, further comprising:
    a twin jet propulsion system for propelling the motorcycle on water, the twin jet propulsion system having a first jet with an inlet and an outlet and a second jet with an inlet and an outlet.

16. The amphibious motorcycle of claim 8, further comprising:
- a twin jet propulsion system for propelling the motorcycle on water, the twin jet propulsion system having a first jet with an inlet and an outlet and a second jet with an inlet and an outlet, the first jet being at least partially disposed in one of the side portions of the hull on one side of the rear wheel bay and the second jet being at least partially disposed in the other of the side portions of the hull on an opposite side of the rear wheel bay.

17. The amphibious motorcycle of claim 1, wherein the center portion and side portions of the hull are fixed with respect to each other so as to form a generally rigid hull.

18. An amphibious two-wheeled motorcycle comprising:
- A retractable front wheel of the two-wheeled motorcycle;
- a retractable rear wheel of the two-wheeled motorcycle, wherein the retractable front wheel and the retractable rear wheel are in a same track; and
- a hull having a bow, the bow having a central bow portion and a pair of side bow portions, the bow having a front wheel bay defined by a gap between the pair of side bow portions both when the retractable front wheel is in the deployed position and the retracted position, the retractable front wheel being disposed at least partially within the retractable front wheel bay when the front wheel is in the deployed position.

19. The amphibious motorcycle of claim 18, further comprising:
- a frame, hull or body form or other structure for supporting one or components or sub-assemblies of the amphibious motorcycle, wherein:
- the front wheel with a front suspension system is mounted to said frame, hull or body form or other structure; and
- the rear wheel with a rear suspension system is mounted to said frame, hull or body form or other structure.

20. The amphibious motorcycle of claim 1, further comprising:
- a frame, hull or body form or other structure for supporting one or components or sub-assemblies of the amphibious motorcycle, wherein:
- the front wheel with a front suspension system is mounted to said frame, hull or body form or other structure; and
- the rear wheel with a rear suspension system is mounted to said frame, hull or body form or other structure.

* * * * *